(12) United States Patent
Klank et al.

(10) Patent No.: US 6,208,695 B1
(45) Date of Patent: Mar. 27, 2001

(54) METHOD FOR RECEPTION OF MULTICARRIER SIGNALS AND RELATED APPARATUS

(75) Inventors: Otto Klank, Lehrte; Juergen Laabs, Pattensen; Wolfgang Klausberger, Laatzen, all of (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 09/028,390

(22) Filed: Feb. 24, 1998

Related U.S. Application Data

(63) Continuation of application No. 08/794,276, filed on Jan. 31, 1997, now abandoned.

(30) Foreign Application Priority Data

| Feb. 2, 1996 | (EP) | 96101510 |
| Feb. 28, 1996 | (EP) | 96102943 |
| Jun. 19, 1996 | (EP) | 96109801 |

(51) Int. Cl.⁷ ............................ H04K 1/10; H04L 27/28
(52) U.S. Cl. ......................................... 375/260; 375/354
(58) Field of Search ................................ 370/404, 203, 370/210; 375/316, 326, 354, 362, 260

(56) References Cited

U.S. PATENT DOCUMENTS

| 5,191,576 | * | 3/1993 | Pommier et al. | 370/210 |
| 5,345,440 | * | 9/1994 | Gledhill et al. | 370/210 |
| 5,444,697 | | 8/1995 | Leung et al. | 370/19 |
| 5,452,288 | * | 9/1995 | Rahuel et al. | 370/203 |
| 5,487,069 | * | 1/1996 | O'Sullivan et al. | 370/404 |
| 5,596,582 | | 1/1997 | Sato et al. | 370/509 |
| 5,608,764 | | 3/1997 | Sugita et al. | 375/344 |
| 5,694,389 | | 12/1997 | Seki et al. | 370/208 |

FOREIGN PATENT DOCUMENTS

| 0717894B1 | 6/1996 | (EP) | H04L/5/06 |

* cited by examiner

*Primary Examiner*—Don N. Vo
(74) *Attorney, Agent, or Firm*—Joseph S. Tripoli; Kuniyuki Akiyama

(57) ABSTRACT

A problem in the reception of terrestrially transmitted digital multicarrier broadcast signals is synchronization in case a receiver is switched on or tuned to another channel. The time required by the receiver to reach a given tuning frequency with adequate accuracy and to determine that the currently received signal is not a system-compliant signal is reduced significantly if a characteristic value calculated from correlation values between a windowed and FFT transformed section of the received signal and a reference symbol stored in the receiver does not exceed a pre-defined threshold. In such case the receiver can go ahead to the next tuning frequency. If, however, the characteristic value exceeds that threshold, then a system-compliant signal is found, even with an offset. The multicarrier signal will be further decoded in the normal way. Such conformity check can also be carried out in the subsequent normal reception mode.

16 Claims, 2 Drawing Sheets

Figure 4:
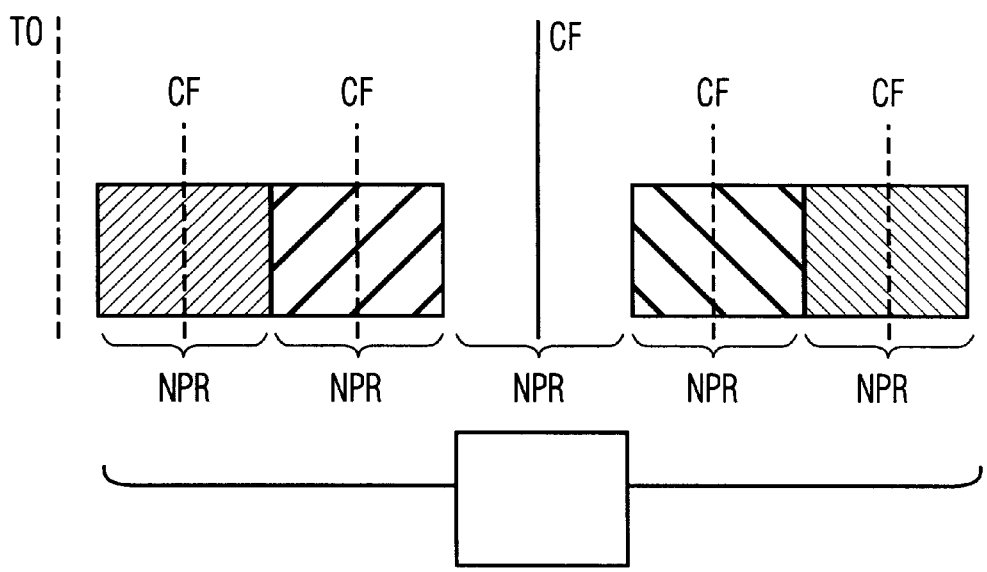

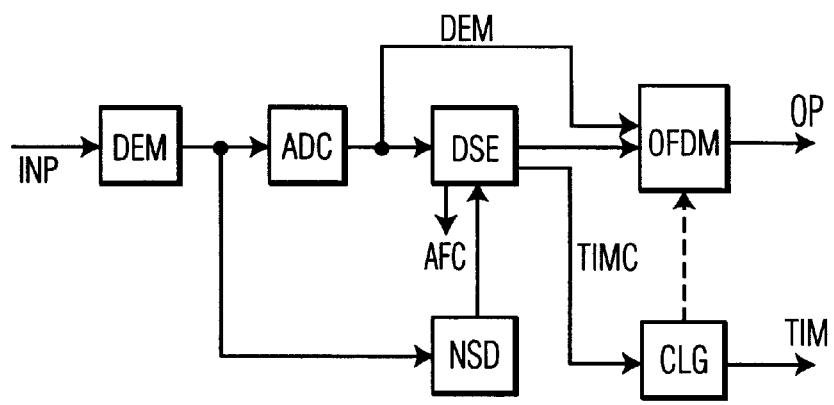
FIG. 1
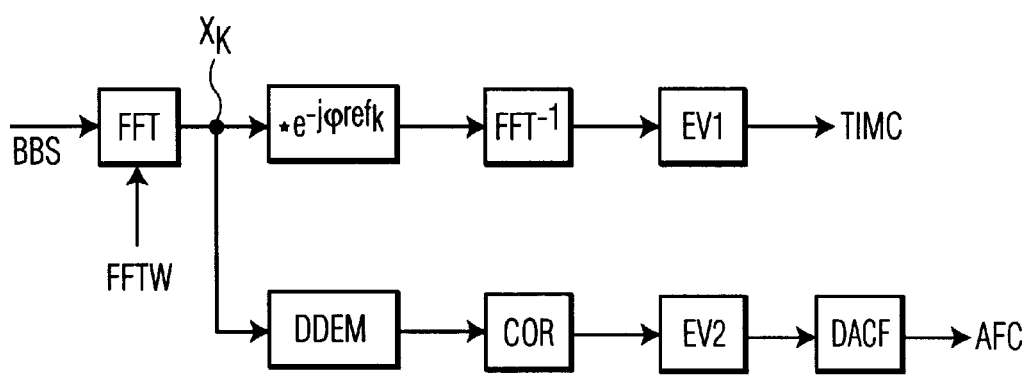
FIG. 2
| V | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $Rc_V$ | 0 | -1 | 1 | 1 | -1 | 1 | 0 | 1 | 0 | -1 | -1 | 1 | 1 | 1 | 0 | 1 |
| $Ic_V$ | 1 | 0 | 0 | 0 | 0 | 0 | -1 | 0 | -1 | 0 | 0 | 0 | 0 | 0 | 1 | 0 |
FIG. 3

METHOD FOR RECEPTION OF MULTICARRIER SIGNALS AND RELATED APPARATUS

This application is a continuation of application Ser. No. 08/794,276, filed Jan. 31, 1997, entitled Method for the Reception of Multicarrier Signals and Related Apparatus, which is now abandoned.

The present invention relates to the reception of multi-carrier RF signals and to a corresponding apparatus.

BACKGROUND

Various methods for terrestrial transmission of digital broadcast signals are known, having modulation types like OFDM, QPSK and QAM. A main concern in connection with such systems is to find a system-conform signal in case a receiver is switched on or tuned to another channel. Examples for such broadcast signals are DVB (digital video broadcast), HDTV-T (hierarchical digital television transmission) and DAB (digital audio broadcast) signals.

Considerations on DAB receiver tuning concepts are so far based on the assumption that an acceptable number of fixed DAB center frequencies can be used, if necessary with small offsets of quite below the 16 kHz step size. A reasonable approach is given by the CEPT (conference Européenne des administrations des postes et des télécommunications) T-DAB allotment plan of July 1995. This approach would result in a reasonable time to scan the entire set of DAB frequencies and would require an acceptable size of extra memory for storing the corresponding numbers or to provide an adequate algorithm for the calculation during the tuning process.

In addition to the CEPT plan, broadcasters and national organisations are considering a lot of exceptions or, in general, offsets of up to several 100 kHz. The main reason behind these proposals is to reduce the influence from and to other services in the same or neighbouring frequency sections. Such scenario would increase the amount of fixed channel numbers to be tuned and subsequently the size of the receiver memory and the scanning time for the entire frequency set.

An accompanying proposal made by the industry is—in order to minimise the constraint for the receiver design—that all transmitters are obliged to transmit all other DAB transmitter frequencies of a wide area around that one which provides the information. However, it is questionable whether such method is practicable.

INVENTION

The applicant has carefully considered above ideas. These considerations are not limited to a specific transmission signal like DAB as specified in the ETSI (European telecommunications standards institute) standard ETS 300 401, November 1994, but can be applied to any signal which is conform to the selected main transmission system.

There are some possible ways for the introduction phase of such a transmission system:
A) A fixed number of additional (known) frequencies is added to the list given by CEPT, which increases the total amount of frequencies up to e.g. 50%. However, this has to be agreed on a world-wide or at least European-wide basis to allow simpler receivers to stick only to these numbers.
B1) A reasonable number of additional unknown frequencies is used.
B2) A reasonable number of additional, not generally defined frequencies is used and notified (possibly together with the known frequencies) via the transmitters in a wide area around the one referring to. This condition must be agreed to by all broadcasters on a world-wide or at least European-wide basis.
C) A general (possible) offset of n-times the defined frequency step size of 16 kHz is introduced.

The so-far-known proposals from the broadcasters result for Band III and L-band in 6(or 26)+23+9=38 (or 58, respectively) additional DAB frequencies which leads already in maximum to a 95% increase of frequencies with respect to the number based on the CEPT plan. A special European solution would require an increase of max. 57%.

The main question is whether this is an agreeable basis and whether further exceptions can be avoided. New services may require additional frequency numbers and may not accept the rule of transmitting the frequency information for surrounding transmitters. On the other hand, a solution with several offsets for all frequencies increases the number of tuning positions by e.g. 100% per additional offset position. This would have a great impact on the receiver design and also on the tuning performance.

There are some general requirements from a user's point of view. DAB receivers will be compared with and measured on the performance of well-known FM receivers. Good FM car radios normally run through the whole band (without an input signal) in a few seconds and will not miss any station received with reasonable power. Therefore, a user would not understand and finally not accept a DAB receiver that needs more than 5 or 10 seconds to decode the first station or ensemble.

Also, the situation that a receiver is not able to tune all transmitters or ensembles in the rated band (given by the receiver specification or data sheet) is not acceptable. This would require that all frequencies or channel numbers (within the 16 kHz raster) which can not definitely be excluded must be tuned.

The transmitted signal includes a multiplicity of modulated carriers (known as OFDM modulation which is described e.g. in "Data transmission by frequency division multiplexing using the discrete Fourier transform", Weinstein, S. B. et al., IEEE Transactions on Communication Technology, Vol. COM-19, No. 15, October 1971 and "An orthogonally multiplexed QAM system using the discrete Fourier transform", Hirosaki, B., IEEE Transactions on Communication Technology, Vol. COM-29, No. 7, July 1981). E.g. QPSK and/or QAM modulation can be used for these carriers. A certain amount of the total channel capacity may be assigned to synchronisation and channel estimation/correction data. One or more time frequency phase reference symbols may be included into the transmitted signal. These reference symbols can be modulated by a certain number of additional sequences suited for correlation, for instance CAZAC sequences (constant amplitude zero auto-correlation). The features and the decoding of such CAZAC sequences are described in EP-A-0529421. The DAB transmission signal is described e.g. in clauses 14.1 to 14.4 of ETS 300 401.

In a decoder, such reference symbols are evaluated subsequently to demodulation (including FFT), differential decoding, and re-conversion (i.e. arranging in the original signal sequence prior to shifting etc. for modulation) of the sequences by performing a correlation.

The resulting information is taken to correct
- the frequency of at least one of the oscillators being used in the receiver for frequency conversion
- or in a similar arrangement, e.g. a multiplier
- or in case of PLL controlled oscillators for correcting the reference oscillator.

In the DVB system the reference symbols include additional M-sequences which allow to determine and to correct significant deviations of the normal receiver oscillator frequency or to determine and to correct the oscillator frequency if the transmitter frequency deviates from a given raster (offset).

Now, specific receiver problems and possible tuning strategies are considered. An important factor for all cases is the time needed by the receiver to reach a given tuning point with adequate accuracy and to exclude the possibility that there is a DAB-compliant signal. After evaluating this, the same procedure can be applied for the next tuning point, and so on.

If, however, a DAB-compliant signal (or a signal which is conform to any other pre-selected transmission system) has been found—even with an offset—the goal is reached and another strategy for the further processing is to be applied which is described below.

The normal tuning or searching procedure may comprise the following steps:

a) Settling the oscillator control and the PLL to the pre-defined values.
b) Null symbol detection and testing: delivers, with rather low probability, an information whether the signal is a DAB ensemble or not.
c) Mode detection and setting.
d) Coarse time synchronisation and AFC: requires FFT, includes reference symbol evaluation and allows to derive an information whether or not a DAB signal has been received.
e) Fine time synchronisation.
f) Fast Information Channel evaluation, further settings and compliance tests, based, for instance, on coding/decoding control, and de-interleaving.

Steps a) to f) require a time period of 1 to 1.5 s per tuning point. If a DAB frequency band has e.g. about 1500 possible frequencies for checking and all steps a) to f) would be carried out for each frequency, a single scan through the whole band would require an unacceptable time of about 30 minutes.

It is one object of the invention to disclose a method which allows to get a relative fast and reliable information on the status of the received signal, whether or not it is a system-conform signal with enough noise distance. This object is reached by the method disclosed in claim 1.

It is a further object of the invention to disclose an apparatus which utilises the inventive method. This object is reached by the apparatus disclosed in claim 11.

At least the evaluation of the reference symbol mentioned above under point d) provides a reliable information on the received signal which allows to decide on further steps. The minimum time to reach a first result is for the average case:

20 ms for setting the oscillator control and PLL, and 1.25 frames (½ frame due to the probability of finding a reference symbol and ¾ frame for evaluation), which makes about 140 ms for DAB Mode I and about 50 ms for DAB Mode II. To increase the reliability of the result, one more frame could be included, thereby increasing the values to 235 ms and 75 ms (Modes I and II, respectively; see table 38 and clause 15.1 of ETS 300 401).

However, the test on system signal (DAB) conformity must start with one mode, probably Mode I in Band III, and if the result for Mode I is negative (which is the general assumption for a next step to be carried out with the same procedure), then an additional Mode II check must be carried out. It can be assumed that the additional time is less than 50 ms. The general check time for a tuning point is estimated to be in the range of 160 ms to 250 ms whereby the latter value provides more reliability.

To check Band III in 16 kHz steps would then still require about 4020 steps multiplied by 0.25 s/step which is about 1000 s. This large time period indicates that a scanning of all possible (16 kHz) steps within a band can not be made a general rule. On the other hand, a realisation for cheaper receivers may even result in a bigger time value per step, e.g. 0.35 s.

If only a limited number of fixed frequencies, e.g. based on the CEPT plan, is to be tuned the total band scan time is reduced to about 9.5 s which is a reasonable basis for the receiver design and the "competition" with FM receivers. Even considering a worst-case time of 0.35 s per step and an increased frequencies quantity by e.g. 50% would result in a period of about 20 s which could still be acceptable—taking into account that this value applies for the worst case where just one ensemble at the edge of the band (opposite from the starting point) will be found. In the general case presumably time values in the order of 5 s or 10 s, respectively, would be required.

The scanning time for L-Band is less critical: a search for Mode II would require about or less than 1s. If a second mode and also a second set of frequencies is taken into account (e.g. for Europe and Canada), the result would be in the order of 3s. The average time can be estimated to be about or less than 2s.

For each position where a system-conform multicarrier RF signal is identified by the first testing, which might be the case even under the condition of a remarkable offset, the test routine has to be extended by further AFC checks and finally completed by above steps e) and f) and the remainder of step d).

The inventive receiver decodes multicarrier RF signals which are arranged in frames and which include synchronisation signals or synchronisation information, and reference symbols, in particular OFDM signals which preferably comprise a periodically repeated null symbol and at least one periodically repeated reference symbol per frame. The reference symbol may carry CAZAC sequences. The receiver includes a clock recovery or timing system which implies the detection and evaluation of the synchronisation information, in particular the null symbol, and includes means for an AFC process in which at least a coarse frequency deviation of the IF or baseband signal is calculated, based on the reference symbol, in particular on the CAZAC sequences, whereby the following processing steps are carried out when tuning:

1) the receiver performs a frequency scanning or signal searching process, e.g. by setting the mixer oscillator to pre-defined values according to a frequency list or performing pre-defined frequency steps;
2) the synchronisation information or null symbol is detected by evaluating the received power, preferably over the length of one null symbol and synchronisation information section, respectively;
3) the symbol window position of a subsequent—in the DAB system preferably the following—reference symbol is estimated (an example is given below). In systems like DVB in which a frame includes more than one reference symbol it is also possible to estimate not this (time) window position but that for one of the subsequent reference symbols in order to allow more processing time for this estimation;
4) the FFT of the reference symbol is performed using this window setting. In the DAB system the frequency window has a length of 1536 carriers in mode I (for hardware reasons the FFT has a length of 2048), 384 carriers in mode II (FFT: 512), and 192 carriers in mode III (FFT: 256);
5) after demodulation—in particular differential demodulation—of the FFT output signal a correlation is performed in each case for a section of carriers. (the frequency window can be partitioned into a respective number of shorter sections in which the correlation is carried out), using a generic reference symbol stored in the receiver. This correlation normally delivers a coarse frequency deviation of the down-converted multicarrier RF signal. In case of DAB each correlation step value will involve 16 adjacent carriers from a section of 32 carriers whereby the group of 16 adjacent carriers is shifted carrier by carrier over the 32-carrier section;

6) the FFT transformed reference symbol is evaluated by the following intermediate steps in order make a decision whether or not the received signal is a system-conform multicarrier RF signal;

6.1) the maximum result of the different correlation steps within the range of one center position and −7 to +8 or −8 to +7 steps or within a reduced range, e.g. ±5 steps, is determined (the ranges −7 to +8 or −8 to +7 comprise 16 carriers which allows to 'scan' without any gap in a 32-carrier section system);

6.2) the ratio of the maximum correlation step value or of the sum of the two maximum correlation step values (in case the two maximum values are adjacent and approximately equivalent) to the average of the remaining correlation step values from the carrier section is calculated, whereby the "remaining values" to be used for calculating this average value may also consist of e.g. only ±5 values around the position of the maximum value or values;

6.3) the multicarrier RF signal is called a system-conform signal if the calculated ratio from step 6.2) exceeds a pre-defined threshold. Preferably, this threshold has a value which is about 3 to 8 times greater than above average of the remaining correlation step values from the current carrier section;

7) if the received multicarrier RF signal is a system-conform signal (and the s/n ratio is high enough), the receiver proceeds as any system-conform receiver (time synchronisation, AFC, deinterleaving, decoding etc.); if the multicarrier RF signal is not recognised as a system-conform signal, the receiver returns to or continues with the frequency scanning or signal searching process according to step 1.

As an alternative to steps 5) to 6.2), the correlation can be performed without splitting the FFT output, i.e. the FFT transformed reference symbol information, into shorter sections and without re-conversion, i.e. the correlation can be performed with the real content of the reference symbol or with a reduced number of carriers preferably around the center, and with a corresponding part of reference information stored in the receiver. The maximum result from the different correlation steps is determined, but in this embodiment within an extended range to both sides of the center. This extended range corresponds to the maximum offset that shall be detected. The ratio of the maximum correlation step value, or of the sum of the two maximum correlation step values, to the average of the remaining correlation step values is determined and compared as described under step 6.3), but with a different threshold. The comparison result is used as described under step 7). The formulas which can be used for this embodiment are described below.

The invention allows to get a fast and reliable information on the status of the received signal, whether or not it is a system-conform signal with enough noise distance. This feature reduces the scanning time for a frequency range or a number of defined transmitter frequencies by a factor of 5 to 10.

In principle, the inventive method is suited for the reception of multicarrier signals which are arranged in frames with a synchronisation signal and at least one reference symbol per frame, using the following steps:

performing a frequency scanning or signal searching process;

detecting the synchronisation signal;

estimating a reference symbol time window position and computing a FFT using said time window position;

demodulating the FFT output signal and carrying out a correlation within a section, which preferably is shorter than the length of said FFT, using a generic reference symbol stored in the receiver;

calculating from the correlation step values a characteristic value;

determining the multicarrier signal as being a system-conform signal if said characteristic value exceeds a predefined threshold and further decoding said multicarrier signal;

determining the multicarrier signal as being not a system-conform signal if said characteristic value does not exceed said pre-defined threshold and starting again or continuing said scanning or searching process.

Advantageous additional embodiments of the inventive method are resulting from the respective dependent claims.

In principle the inventive apparatus is suited for the reception of multicarrier signals which are arranged in frames with a synchronisation signal and at least one reference symbol per frame, and includes:

means for performing a frequency scanning or signal searching process;

means for detecting the synchronisation signal;

means for estimating a reference symbol time window position and for computing a FFT using said time window position;

means for demodulating the FFT output signal and means for carrying out a correlation within a section, which preferably is shorter than the length of said FFT, using a generic reference symbol stored in the receiver;

means for calculating from the correlation step values a characteristic value and for determining the multicarrier signal as being a system-conform signal if said characteristic value exceeds a pre-defined threshold and for further decoding said multicarrier signal and for determining the multicarrier signal as being not a system-conform signal if said characteristic value does not exceed said predefined threshold and for starting again or continuing said scanning or searching process in said means for performing a frequency scanning or signal searching process.

Advantageous additional embodiments of the inventive apparatus are resulting from the respective dependent claims.

DRAWINGS

Figure 5:
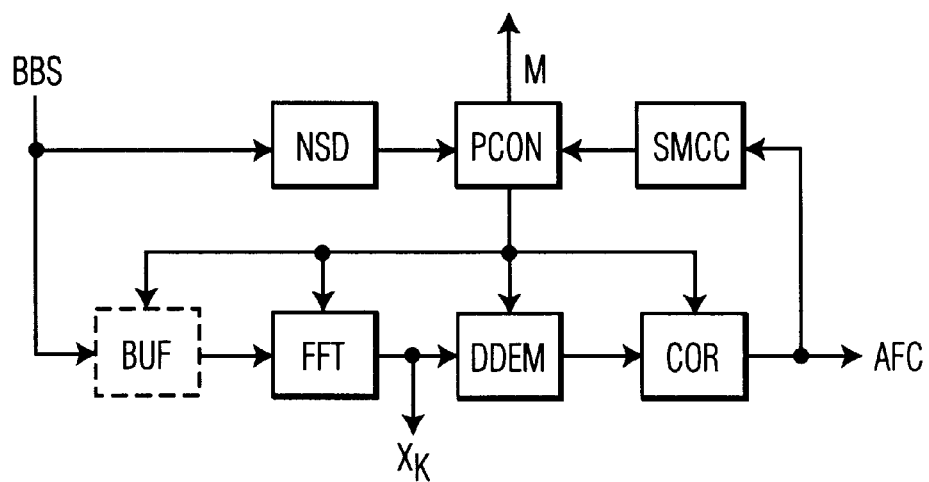
Figure 6:

Preferred embodiments of the invention are described with reference to the accompanying drawings, which show in:

FIG. 1 block diagram of a receiver according to the invention;

FIG. 2 more detailed block diagram of the digital synchronisation processing;

FIG. 3 generic CAZAC sequence;

FIG. 4 channel search for offset positions;

FIG. 5 further embodiment for conformity check;

FIG. 6 more detailed block diagram of null symbol evaluation and coarse time synchronisation for the embodiment of FIG. 5.

PREFERRED EMBODIMENTS

In FIG. 1 a received input signal INP is demodulated in a demodulator circuit DEM. Following A-to-D conversion, a respective time section of the received signal may be stored in the receiver. In a prior art receiver as well as in the inventive receiver time synchronisation starts with a detection of the null symbol in a succeeding null signal part detector NSD, which implies envelope calculation, matched filtering and center calculation. This can be done either by analogue/digital or by pure digital processing. The further processing in the inventive receiver is carried out as follows: If a system-conform signal is detected, the output signal of demodulator DEM is converted to a digital signal in analog to digital converter ADC and input as a baseband signal BBS to OFDM decoder OFDM which delivers the final output signal OP. The output signal of ADC also enters a digital synchronisation evaluator DSE which controls OFDM and which supplies control data TIMC to a clock generator CLG. CLG clocks OFDM and outputs timing signals TIM.

In the DSE, time and frequency synchronisation can be performed in parallel in the frequency domain as shown in FIG. 2. The FFT process (fast Fourier transform) in circuit FFT is started with a window based on the detected null symbol or null signal part.

A complete time synchronisation is performed only in case a system-conform multicarrier RF signal has been found. The output signals $X_k$ of FFT pass through a conjugate-complex sequence multiplier CCSM, an inverse FFT circuit $FFT^{-1}$ and a first evaluation circuit EV1. The first reference symbol of the frame is evaluated in these circuits as time reference. The procedure can be seen as equivalent to a correlation in the time domain and yields the channel pulse response. The position of the first or main pulse TIMC with respect to the former FFT window or frame start is used for a fine adjustment FFTW of the FFT window and of the clock generator CLG. In EV1 a frame-synchronous counter which is controlled by the pulses derived from the channel pulse response, delivers the frame start and other timing information TIMC, wherein e.g. symbol starts, FFT window(s) and sampling clock are derived by dividing up the time sections between the frame starting points.

Frequency synchronisation starts with a wide-range estimation of the frequency offset of the A/D converted and FFT transformed baseband signal BBS. The (transformed) signal $X_k$ is differentially decoded in the differential demodulator DDEM and a correlation, using the reference symbols and stored—e.g. in COR—reference information, is performed in COR over a certain number of carrier shifts (in DAB within a section of 32 carriers) from the expected center point. The differential demodulation DDEM and correlation COR process (within the frequency domain) are in case of DAB performed with the CAZAC sequence part of the reference symbols over e.g. −7 to +8 or −8 to +7 steps or carrier shifts. This delivers a first narrow-range frequency offset value. More exactly, the different sections—each with 2-times the same sequence—are reconverted to the generic sequence and averaged. Finally, a correlation is made with the result.

In the embodiment where a correlation without splitting into sections and without reconversion is made, the content of the received and FFT transformed reference symbol is directly correlated with a corresponding reference information stored in the receiver. This correlation is performed over an enlarged range of correlation steps, the length of which preferably corresponds with the maximum offset that shall be detected. This extension of correlation length is made in that direction or directions in which an offset position or offset positions shall be detectable. In case the offset positions are arranged symmetrically around the center or standard frequency, the enlarged range needs not to be asymmetrically around the center or standard frequency like in the other embodiments.

In a subsequent or parallel second evaluation circuit EV2 the system conformity check [steps 6.1) to 6.3)] takes place.

In parallel, or preferably before calculating the final AFC results, the amplitude values of the different correlation steps are evaluated. A relationship between the maximum or the sum of the two maximum correlation values [see step 6.2)] and an average of the remaining correlation values is calculated. This average can be calculated according to the following formula:

$$\sqrt{\frac{\sum_i |W_i|^2}{16-x}}, \quad -7 \leq i \leq 8 \text{ or } -8 \leq i \leq 7, \tag{A}$$

wherein W is a correlation value, l is the current position within this frame section, and x is '1' in case of one maximum correlation value is taken and is '2' in the other case, and whereby for i such number or numbers are excluded where the maximum and the two maxima, respectively, correlation values are positioned.

After this, a check is made whether the result exceeds a predefined threshold. If this check is true the signal is assumed to be a system-conform multicarrier RF signal and the receiver proceeds in the "normal way" as any system-conform receiver (time synchronisation, AFC, deinterleaving, decoding etc.).

If threshold is not exceeded it is assumed that no system-conform multicarrier RF signal has been found and the receiver returns to or continues with the frequency scanning or signal searching process.

Instead of calculating the ratio of the maximum value or the two maximum values to the average of the remaining values like in step 6.2) a similar computation may be carried out, e.g. calculating the standard deviation or variance of all correlation values from the current carrier section and setting a correspondingly adapted threshold.

Instead of using the full quantity of basic reference sequences of the reference symbol an average of a reduced number of the adjacent correlation values, preferably around the maximum correlation value and the two maximum correlation values, respectively, is used to perform the correlation in step 5).

In case a system-conform multicarrier RF signal has been determined in EV2, an exact value of the frequency deviation is achieved by a modified differential demodulation process and a fine correlation/calculation. In this case, only two correlation steps near the exact constellation may be performed and these two results are used to calculate the frequency deviation. The information from both, the first narrow-range estimation and the fine correlation, i.e. the resulting deviation of the maximum from the expected center point, is D/A converted and filtered in a D/A converter DACF to an equivalent analogue value AFC, and is used to correct the frequency reference or the offset for the mixing oscillator(s) in the RF front-end part ahead of demodulator DEM.

Processing steps of the normal AFC process and a related mathematical description are given below as an example (valid for DAB Mode I). It has to be taken into account that the carrier positions in this case are numbered according to a FFT range from 0 to 2047.

The frequency estimation and correction is performed in two steps, a wide-range and a narrow-range evaluation and correction where the latter can be regarded as a continuous frequency control (AFC). First, the differential demodulation of the received reference symbol values $U_k$ is performed over the full length:

$V_k = U_k + 1 U_k^*$; $256 \leq k \leq 179$

For the narrow-range estimation the following calculations (or processing steps) are performed:

Split the differential demodulated values $V_{256} \ldots V_{1791}$ into 48 sections of length 32 (24 below and 24 above center);

Reconvert the 48 sections according to the above described modulation scheme into the generic CAZAC sequence, where the following phase shifts have to be applied (see table 39 of ETS 300 401):

i=0:0
i=1:π/2
i=2:π
i=3:π/2

Average the corresponding values of all sections; the result is 32 values wide;

Evaluate $$l = \sum_{m=0}^{15} V_m c^*_{(m-l)mod16}; -7 \leq l \leq 7,$$

wherein l is the current position and c* is a generic sequence (in DAB: a CAZAC sequence, see FIG. 3);

Search $W_{max}$=max $|W_l|$, which is located at $l_{max}$;
Search $W_{max2}$=max2 $|W_l|$, which is located at $l_{max2}$, wherein max2 is the second largest value;

Compute the ratio according to step 6.2) or formula (A).

If a system-conform multicarrier RF signal has been found, compute with above result $\Delta f=l_{max}F_s$, otherwise, start again from the beginning. $F_s$ is the carrier distance.

In the embodiment where the correlation is carried out without splitting the FFT transformed reference information into sections, the following steps are performed:

Evaluate $$W'_l = \sum_{m=256}^{m=1791} V_{m-l} d^*_m; -n/8 \leq l \leq n/8$$

wherein the numbers 256 and 1791 are valid for DAB mode I and n may correspond to the length '2048' of the FFT, but can also be selected according to the offset which shall be determinable and wherein d* is an extended generic sequence. This extended generic sequence may have the following structure:

the generic sequence of FIG. 3 is doubled. From this version three further versions are derived by 1 to 3 times phase shiftings of 90°. 48 packs of the four versions are arranged in a certain order to form as an extended generic sequence a total pack of length 1536;

Search $W'_{max}$=max $|W'_l|$, which is located at $l'_{max}$;
Search $W'_{max2}$=max2 $|W'_l|$, which is located at $l'_{max2}$, wherein max2 is the second largest value;

Compute the ratio according to step 6.2) or formula (A).

If a system-conform multicarrier RF signal has been found, compute with above result $\Delta f'=l'_{max}F_s$, otherwise, start again from the beginning.

If a system-conform multicarrier RF signal has been found a first narrow-range AFC is based on $\Delta f$ or $\Delta f'$, respectively.

In the embodiment where the correlation is carried out without splitting (result W'$_l$), and if $\Delta f$ or $\Delta f'$ is less than e.g. ±7*$F_s$, the basic calculations with splitting the differentially demodulated and FFT transformed values into shorter sections like for the other embodiments have to be made afterwards in order to perform above narrow-range estimation. These basic calculations will result in corresponding values $W_l$, $W_{max}$, and $l_{max}$ which are required for the following calculations.

Select 48 sections of the length 32 of the received reference symbol values $U_k$; 24 below and 24 above a new center value which is derived from the theoretical center point by correction with $l_{max}$; denote the new centred values U'$_k$. Then evaluate, using the context of FIG. 3 for $c^*_m$ and $c^*_{(m+1)mod16}$:

$$l = U'_{l+1}U'^*_{l+1} + U'_{l+2}U'^*_l; 0 \leq \lambda \leq 16$$

$$B = \sum_{m=0}^{15} V'_m c^*_m$$

$$= \sum_{m=0}^{15} V'_m c^*_{(m+1)mod16}$$

$$D = 2W_{l_{max}} - B$$

$$E = 2W_{l_{max}} - C$$

$$\Delta f = F_s \left( l_{max} + \frac{EC^* - DB^*}{EE^* + DD^*} \right)$$

A final $\Delta f$ result is calculated in EV2 by averaging the 48 results. The final $\Delta f$ values of all reference symbols are used after D/A conversion and filtering to control the reference oscillator(s) in the front-end part as described above. More details of multicarrier RF signal synchronisation and decoding are described in WO95/07581 of the applicant. FIG. 3 shows a basic/generic CAZAC sequence of length 16, defining real and imaginary part of $c_v$.

The arrangement of pairs allows a correlation, without disturbance by the (different) neighbouring sequences, to be performed in the receiver. In this case, only the medium part of the doubled sequences is used. As mentioned above this type of sequence is described in more detail in EP-A-0529421.

FIG. 4 depicts a modified case M1) wherein a center frequency CF to be tuned is expected to be in an offset position and the scanning or signal searching process and the synchronisation signal detection in NSD, window position estimation in DSE, FFT, and possibly differential demodulation DDEM are carried out for the standard (non-offset) position. In this case, the correlation calculation in COR and the characteristic value calculation in EV2 are carried out for several positions around the center or standard position. CF is assumed to be in a frequency section that has been shifted by ±n-times the length of the generic reference sequence, n being a natural number. In case of DAB this generic reference is a CAZAC sequence having a length of 16 carriers). With a certain probability this procedure is able to detect center frequencies even if they are outside the normally processed range NPR. OPR is the processing range for the case where an offset of the transmission frequency is expected. TO is the transmitter offset which can lie outside OPR but which is still detectable.

In a further embodiment where only one or two offset positions are defined, it is sufficient to perform the described process for this position or these positions.

Steps 6) to 7) are carried out as before.

There are further possible modifications of the processing:

M2) Using the same results from steps 1) and 2) and starting with step 3), performing different modes after each other, e.g. in the case of a DAB system modes I and II, before returning to the frequency scanning process.

This means that the scanning or signal searching process and the synchronisation signal detection in NSD are kept but that the window position estimation in DSE, FFT, differential demodulation DDEM, correlation calculation in COR, and characteristic value calculation in EV2 are carried out for the different transmission modes one after each other.

M3) Instead of reconverting and combining the sections of all basic sequences (2*16 in the ETSI-DAB specification) according to step 5), the arrangement of basic sequences in the reference symbol or a reduced quantity, preferably around the center frequency, is directly used and a correlation is made of the received part and the corresponding part stored in the receiver. The result delivers also a maximum or a number of maxima in the distance of 16 shifts, which is then evaluated according to step 6) and the further steps, but now taking into account an extended range of m*16–1, m being a natural number.

M4) The receiver performs at first a scanning or testing of such input frequencies or the corresponding values for the mixing oscillator for which there is a high probability that a system-conform signal will be received, e.g. fixed frequencies as defined by CEPT, and performs after this first sequence a scanning of exceptions or of special offsets from the defined centre frequencies, which presumably have a lower probability.

M5) In order to scan a certain frequency range in a minimum of time, the receiver uses during the frequency scanning/signal searching process a step size (distance between frequencies that are to be tested) bigger than that which is to be expected from the system specification or frequency definition plan (e.g. ETSI-DAB/CEPT allotment plan); the step size being a multiple of the specified raster of center frequencies given in the system specification.

M6) The receiver "stores" the already received or tested transmitter frequencies and uses them for a next scanning or searching process.

M7) The receiver "stores" frequencies of other transmitters which are notified by the received transmitter station and uses them for the next scanning or searching process.

M8) The position or positions of the maximum correlation value or values of step 6.1), in particular in modification M1), are used in the receiver in order to define the value of the coarse frequency deviation.

In order to further minimise the time up to the first reception and to ensure that any reasonable signal in a specified and is found, the receiver could apply the following processing or sequences:

M9) scan the most favourable frequencies, e.g. the CEPT numbers and some (general) additions, possibly combined with a band pre-setting by the user;

M10) scan the country-specific exceptions (if such are defined);

M11) scan the frequencies of M9) with (general) offsets (if such are defined; the numbers from M9) and M10) may be left out);

M12) scan the whole band(s) in 16 kHz steps under certain level conditions (only "good" signals). The numbers from M9), M10), and M11) and possibly the corresponding frequency sections are left out;

M13) scan the whole band(s) in 16 kHz steps, all possible signals. The numbers from M9), M10), M11), and M12) are left out.

Alternatively, M11) may be performed directly after M9) in cases where a DAB signal has been indicated by step M9) but no decoding is possible (presumably due to a center frequency offset).

M12) and M13) can be improved by first runs with bigger distances in order to find a DAB signal—which presumably delivers reasonable results in the null symbol and also in the AFC/reference symbol evaluation even when the signal has an offset of more than 16 kHz (the frequency might be wrong but the indication that there is a DAB signal allows the receiver to proceed in another way; see below).

Further improvements are possible, e.g. by storing the received numbers for the next routine which would then presumably imply a processing or sequence zero (before M9)). However, the stored numbers have to be updated as often as possible—which can not be made if reception of a chosen ensemble or program shall be maintained. E.g., a critical situation may occur during a long drive on which no traffic information shall be missed: after enough time/distance, the frequency numbers will be wrong. The receiver—in order to find another ensemble—may do a lot of unnecessary steps and tests before coming to the general routine as described above.

Additionally, frequencies of other (surrounding) DAB transmitters receivable in a current area, which have been notified by the currently received station, can be used to update the stored numbers or can generally be used when performing the frequency scanning or signal searching process, e.g. for first tuning to respective frequencies. The advantage of such a method is that it will be done during reception and delivers always an actual basis for the next tuning or searching.

In the further embodiment of FIG. 5 the correlation in the frequency domain is easily to implement, is also independent from a frequency shift, and allows a rough synchronisation when setting the FFT-window.

In this embodiment the following steps are carried out:

N1) Start with mode III if provided in the receiver, because mode III works with the shortest null symbol duration and the matched filter for mode III will also detect mode I but not vice versa. If mode III is not provided in the receiver, start with mode II;

N2) Wait for a null symbol. A matched filter is used for detecting the null-symbol in mode III. If after a predetermined time limit no null symbol occurs, switch to another RF (reception frequency);

N3) Perform the coarse time synchronisation by the following steps:
   a) Calculate $I^2+Q^2$.
   b) Digital filtering of this signal with a matched filter for the null-symbol in mode III.
   c) Evaluate the maximum and the minimum value of this matching signal and set a threshold to (maximum value+minimum value)/2.
   d) Calculate the length of the filtered null symbol by detecting the filter signal crossings with the threshold. Compare the calculated length with the null symbol lengths of the standard and decide the mode.
   e) Calculate the temporal middle of the filtered null symbol and add a predetermined correctional time depending on the calculated mode to set the frame synchronisation (FFT-window). Adding the predetermined correctional time $$(N-n)/2$$

N:null symbol length of evaluated mode according to N3d)
   n:length of the impulse response of the used matched filter leads to the beginning at the second symbol in the DAB frame (Phase Reference Symbol). With detecting the null symbol and the mode it is probable that the signal is a DAB ensemble. The following steps N4) to N6) will check the exact system conformity;

N4) Perform FFT and differential demodulation of the reference symbol. For a very fast DAB signal conformity check in the current frame use the buffered reference symbol. Without such buffer, the conformity check can be processed in the next frame.

N5) Carry out a correlation for a section of carriers using the generic reference symbol stored in the receiver.

N6) The signal is treated to be DAB conform, if the resulting maximum correlation step value is about 3 to 8 times greater than the average of the remaining correlation step values. The selected mode is the right one and the receiver continues with the further decoding processes as described above.

If the signal is not recognised as being DAB conform, return to the receiver searching process (switch to another RF).

The input signal BBS (coming from DEM) passes on one side through a null symbol detector NSD (see steps N1 to N3) to a process controller PCON and on the other side through an optional buffer BUF (see step N4), an FFT stage FFT, a differential demodulator DDEM, a CAZAC sequence correlator COR (see step N5), and a signal/mode conformity check SMCC (see step 6) to PCON. At the output of FFT the signal $X_k$ for channel decoding and channel impulse response processing is available. At the output of COR an AFC information is available. At the output of PCON information on the conformity check result, on the finally selected mode, and on the position of the FFT window is available. PCON sets the mode and controls BUF, FFT, DDEM, and COR. BUF is used during mode detection, otherwise bypassed.

The null symbol evaluation is carried out according to FIG. 6 by passing the input signal IP through an $I^2+Q^2$ stage (see step N3a), a digital filter DFIL (see step N3b), and a null symbol digital processing NSDM (see step N3c).

The calculation in EV2 of said characteristic value from the correlation step values can also be performed during a subsequent receiving process in order to survey the normal reception. If after determination as being system conform the received signal can no longer be treated as being system conform, a synchronisation or signal searching process is carried out. To carry out this process the corresponding information is passed to the controller (PCON) of the receiver. Possible criteria for the control of the synchronisation are:

a) One failure or at least two successive failures in the conformity check;

b) Criterion a) together with other criteria like value of error flag of the Viterbi decoder.

The invention can be used for transmission, in particular terrestrial transmission, of e.g. digital TV, digital audio or other data signals.

What is claimed is:

1. A method for the reception of multicarrier signals which are arranged in frames with a synchronisation signal and at least one reference symbol per frame, comprising the steps of:

performing a frequency scanning or signal searching process;

detecting the synchronisation signal;

estimating a reference symbol time window position and computing an FFT using said reference symbol time window position;

demodulating the FFT output signal and carrying out within a frequency section, which preferably is shorter than the length of said FFT, a correlation using a generic reference symbol stored in the receiver;

calculating a characteristic value from correlation step values;

determining the multicarrier signal as being a system-conform signal if said characteristic value exceeds a pre-defined threshold and in such case further decoding said multicarrier signal; and determining the multicarrier signal as being not a system-conform signal if said characteristic value does not exceed said pre-defined threshold and in such case starting again or continuing said scanning or searching process.

2. The method according to claim 1, wherein said characteristic value is the ratio of the maximum correlation step value, or of the sum of two adjacent maximum correlation step values, to an average of all the remaining correlation step values from said section or an average of a reduced number of the adjacent correlation step values surrounding the maximum correlation step value and the two maximum correlation step values, respectively.

3. The method according to claim 1, wherein said characteristic value is calculated from the standard deviation or variance of all the correlation values from said section.

4. The method according to claim 1 wherein a center frequency to be tuned is in an offset position and said scanning or signal searching process and said synchronisation signal detection, window position estimation, and FFT steps are carried out for a standard position whereas said correlation calculation and said characteristic value calculation steps are carried out for said offset position or for several sections or positions around the standard position.

5. The method according to claim 4, wherein said step of demodulation is also carried out for the non-offset position.

6. The method according to claim 1, wherein for performing different transmission modes after each other said scanning or signal searching process and said synchronisation signal detection step are kept but said window position estimation, FFT, demodulation, correlation calculation, and characteristic value calculation steps are carried out for said different transmission modes after each other.

7. The method according to claim 1, wherein the above steps are carried out at first for such multicarrier signal standard frequencies for which there is a high probability that a system-conform signal will be received.

8. The method according to claim 1, wherein the position and positions, respectively, of the maximum correlation value or values are used in order to define a value of a coarse frequency deviation.

9. The method according to claim 1, wherein additionally transmitted information concerning standard frequencies of stations receivable in a current area are used when performing said frequency scanning or signal searching process.

10. The method according to claim 1, wherein for determining the multicarrier signal as being a system-conform signal, in a first step the correlation is carried out without splitting into shorter frequency sections, and in case a system-conform signal has been determined and the resulting roughly calculated frequency deviation is less than a predetermined threshold, carrying out in a second step said correlation within said frequency section, the length of which is shorter than the length of said FFT.

11. Apparatus for the reception of multicarrier signals which are arranged in frames with a synchronisation signal and at least one reference symbol per frame, the apparatus comprising:

means for performing a frequency scanning or signal searching process;

means for detecting the synchronisation signal;

means for estimating a reference symbol time window position and for computing a FFT using said reference symbol time window position;

means for demodulating the FFT output signal and means for carrying out within a section, which preferably is shorter than the length of said FFT, a correlation using a generic reference symbol stored in the receiver; and means for calculating a characteristic value from correlation step values and for determining the multicarrier signal as being a system-conform signal if said characteristic value exceeds a pre-defined threshold and then further decoding said multicarrier signal, and for determining the multicarrier signal as being not a system-conform signal if said characteristic value does not exceed said pre-defined threshold and then starting again or continuing said scanning or searching process in said means for performing a frequency scanning or signal searching process.

12. The apparatus according to claim 11, wherein said characteristic value is computed in said characteristic value calculating means as a ratio of the maximum correlation step value, or of the sum of two adjacent maximum correlation step values, to an average of all the remaining correlation step values from said section or an average of a reduced number of the adjacent correlation step values surrounding the maximum correlation step value and the two maximum correlation step values, respectively.

13. The apparatus according to claim 11, wherein said characteristic value is computed in said characteristic value calculating means from the standard deviation or variance of all the correlation values from said section.

14. The apparatus according to claim 11, wherein said means for calculating said characteristic value carry out that calculation also during a subsequent receiving process in order to survey the normal reception.

15. The method according to claim 11, wherein the calculation of said characteristic value from the correlation step values is also performed during a subsequent receiving process in order to survey the normal reception.

16. The method according to claim 15, wherein, if the received signal is no longer treated as being system conform, a synchronisation or signal searching process is carried out.

* * * * *